United States Patent [19]

Bianchi et al.

[11] 4,271,804

[45] Jun. 9, 1981

[54] METHOD AND APPARATUS FOR DETERMINING FUEL MIXTURE ADJUSTMENT VALUES FOR FUEL BURNING ENGINES

[75] Inventors: Valerio Bianchi, Hochdorf; Peter-Jürgen Schmidt, Schwieberdingen; Reinhard Latsch, Vaihingen; Josef Wahl, Stuttgart, all of Fed. Rep. of Germany

[73] Assignee: Robert Bosch GmbH, Stuttgart, Fed. Rep. of Germany

[21] Appl. No.: 12,533

[22] Filed: Feb. 15, 1979

[30] Foreign Application Priority Data

Mar. 22, 1978 [DE] Fed. Rep. of Germany ....... 2812442

[51] Int. Cl.³ .............................................. F02M 7/18
[52] U.S. Cl. .................................................. 123/440
[58] Field of Search ........ 123/32 EB, 32 ED, 32 EE, 123/119 EC; 60/276, 285

[56] References Cited

U.S. PATENT DOCUMENTS

| | | | |
|---|---|---|---|
| 4,130,095 | 12/1978 | Bowler et al. | 123/32 EE |
| 4,155,332 | 5/1979 | Yaegashi et al. | 123/32 EB |
| 4,157,699 | 6/1979 | Mori | 123/32 EB |
| 4,166,437 | 9/1979 | Bianchi et al. | 123/32 EE |
| 4,200,064 | 4/1980 | Engele | 123/32 EB |

Primary Examiner—Charles J. Myhre
Assistant Examiner—Andrew M. Dolinar
Attorney, Agent, or Firm—Edwin E. Greigg

[57] ABSTRACT

A method for determining adjustment values for a fuel supply device which supplies a fuel mixture to a fuel-burning engine for optimum performance by additionally influencing the preset adjustment values of the fuel supply device itself from values supplied by a storage means containing an engine performance log of adjustment values whereby said performance adjustment values are continuously changed and replaced by values which reflect instantaneous operating engine characteristics. Each replaced value forms the basis for computing a new value upon a change in engine operating characteristics. The apparatus disclosed comprises a fuel supply device, such as a carburetor, which has its adjustment values preset due to its construction, a storage means containing engine performance adjustment values for correcting the preset values of the supply device in response to engine operating characteristics, and a second storage means connected to the fuel supply device and to the first storage means wherein the performance values from said first storage means are continuously adjusted from the engine operating characteristics and stored for use by the fuel supply device for optimum engine operating performance.

13 Claims, 8 Drawing Figures

METHOD AND APPARATUS FOR DETERMINING FUEL MIXTURE ADJUSTMENT VALUES FOR FUEL BURNING ENGINES

BACKGROUND OF THE INVENTION

This invention relates to a method and apparatus for controlling a mixture of fuel and air from a fuel supply unit according to engine operating characteristics for optimum performance conditions.

A system is already available for determining the fuel adjustment values for a fuel supply device in fuel-burning engines which includes a storage device containing a performance log of adjustment values from which signals representing such values are sent to a mechanical control device for adjusting the fuel supply device preset adjustment values according to the operating characteristics of the engine. For example, in a carburetion system, air pressure in the float chamber is changed according to the output signal from the storage device in accordance with certain engine operating characteristics to additionally influence the values in the carburetor which are preset according to its construction tolerances.

One of the disadvantages in the existing system is the relatively long reaction time necessary to change the supply device adjustment values according to the changes of the operating characteristics. This long reaction time results from the fact that large amounts of signals have to be processed continuously. Additionally, the values stored for optimum performance of the fuel supply device have to be first computed for maximum operating conditions and, secondly, the storage device must be programmed with values especially designed for each individual model of fuel-burning engines.

OBJECT AND SUMMARY OF THE INVENTION

This invention has as its principal object a method for determining adjustment values for a fuel supply device used in a fuel-burning engine in which the device preset adjustment values are additionally influenced by adjustment values from a source containing a permanent performance log of values according to the engine operating characteristics and continually replacing and correcting said values for optimum performance of the engine. An advantage of this invention is that only a small amount of signals need to be processed since each time a preceding value serves as a basis for the computation of a new one. Another advantage is that, since optimum engine performance values are automatically produced and stored during the operation of the engine, the source of permanent performance log values need not be carefully computed for optimum performance.

The object of this invention is obtained in a system having a fuel supply device which has its own characteristic preset values because of its construction and a storage device containing permanent adjustment values for influencing the preset values of the supply device depending upon the engine operating characteristics together with a second storage device which receives signals from the first storage device and together with signals from sensors provides a corrected adjustment value for the fuel supply device for optimum engine performance. As will be clear from the ensuing description, the stored value in the second storage device needs to return to zero at the beginning of each engine start since this value is continuously being adjusted according to the engine operating conditions.

Still another advantage of this invention is that due to the nature of the second storage device each system need not be tailored to each model of the engine in which it is used.

The invention will be better understood as well as further objects and advantages thereof will become more apparent from the ensuing detailed description of the preferred embodiment taken in conjunction with the drawings.

DESCRIPTION OF THE PREFERRED EMBODIMENT

This invention is disclosed in connection with a controlled carburetor setting in a fuel-burning engine, however, the invention will work equally as well with fuel injection.

Figure 1:
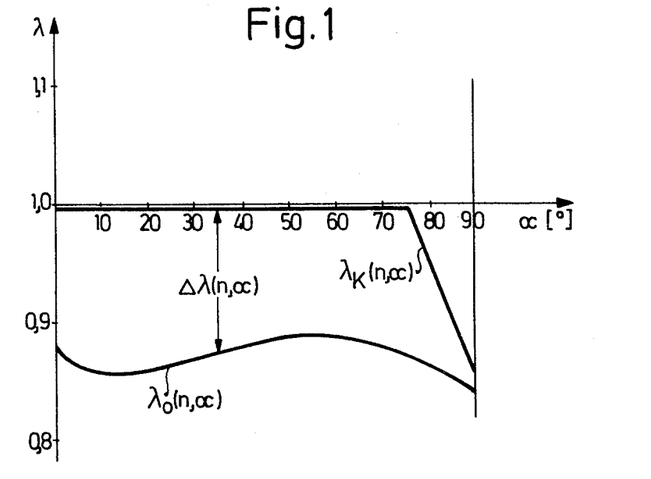
FIGS. 1 and 2 each are diagrams of mixture composition plotted against the throttle valve angle.

Generally, carburetors are unable to control a mixture composition in an optimum way because the carburetor itself has construction tolerances and is without regulating circuitry for including certain variables such as the exhaust gas values into the mixture control. Curve $\lambda_0(n, \alpha)$ of FIG. 1 shows the mixture composition versus the opening angle $\alpha$ of the throttle valve of a known carburetor. However, for an optimum operation of the fuel-burning engine and for control of the emission of exhaust gas, a constant $\lambda$-value of 1.0 is desired within a wide range of the opening angle of the throttle valve. This optimum curve is marked $\lambda k(n, \alpha)$. Since the uncorrected carburetor provides a mixture composition according to curve $\lambda k(n, \alpha)$, which is identified as a presetting, an additional control of the carburetor by a separate adjustment mechanism regulates the mixture composition to the preferred and almost constant value of $\lambda = 1.0$.

From the diagram of FIG. 1, it is apparent that the control device for the adjustment mechanism for the correction of the carburetor setting must send a signal for each angle value of the throttle valve in order to control the deviation of the $\lambda$-value from 1.0. This momentary deviation is indicated by $\Delta\lambda(n,\alpha)$.

Figure 2:
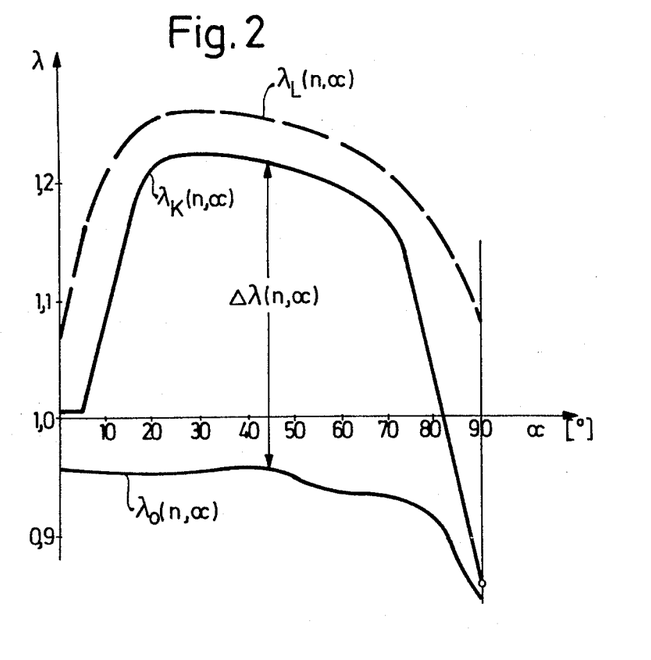

Another diagram of a desired mixture composition is shown in FIG. 2. The dotted line shows $\lambda$-values versus the opening angle of the throttle valve, which represent the so-called meager limit of the fuel-burning engine. A mixture composition of air with only a small fuel portion is called meager. The meager limit is, therefore, the largest proportion of air to fuel by which the fuel-burning engine still runs.

With an uncorrected carburetor system, a meager operation can hardly be achieved, since, and this is true especially during meager operation, engine rotation disturbances, i.e., rough idling, can occur easily and mechanical systems are generally very slow or sluggish in regulating disturbances of that kind. To achieve the curve $\lambda k\,(n,\alpha)$, an adjustment mechanism is used which affects the carburetor and which receives its control signals from an electrical control device.

Figure 3:
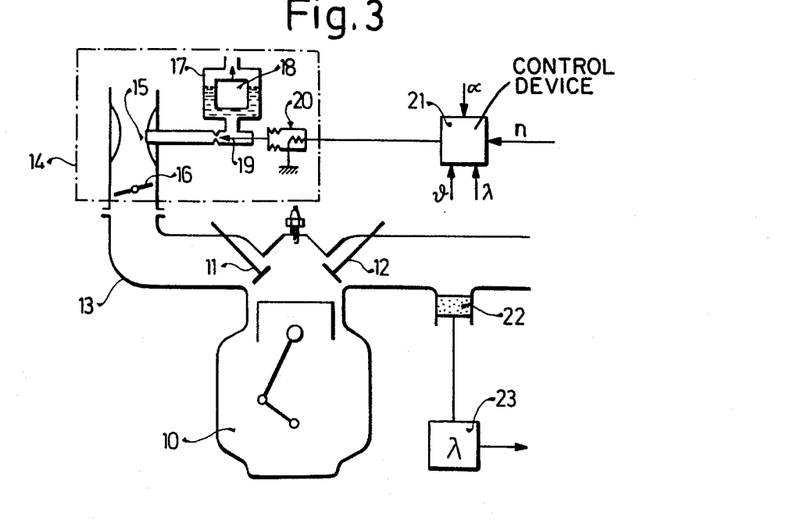
FIG. 3 is a schematic representation of a fuel-burning engine with a fuel adjustment system based on a controllable carburetor.

FIG. 3 shows a schematic representation of a fuel-burning engine with a carburetor, which can be additionally controlled by electric control signals. The fuel-burning engine itself is marked 10, the inlet valve 11, and the outlet valve 12. Upstream from the inlet valve 11 in the area of the air intake 13, a carburetor 14 is shown with a Venturi 15, throttle valve 16 and a float chamber 17. In the float chamber 17, there is a float 18, whose height determines the fuel supply to the Venturi 15. An additional controllable throttle gate for the fuel supply between the float chamber 17 and the Venturi 15 is marked 19. This throttle gate 19 is controlled by an adjustment mechanism 20 which receives its electrical signals from a control device 21. Input values for this control device are, for example, the opening angle $\alpha$ of the throttle valve 16, the engine rotational speed n and a value relative to $\lambda$ the exhaust gas composition. Downstream from the outlet valve 12 in the fuel-burning engine 10, another $\lambda$ probe 22 is placed, whose output signal is processed for further use in a $\lambda$-value-supplier 23.

If the operation of the carburetor 14 is without control, a mixture composition based on the negative pressure in the Venturi 15 and the position of the float 18 in the float chamber 17 is obtained according to the curves $\lambda_0\,(n,\alpha)$ in FIGS. 1 and 2. This setting, based on the physical specifications of the carburetor system, can be corrected by means of the controllable throttle gate 19 and the adjustment mechanism 20 according to the curves $\lambda k\,(n,\alpha)$ of FIGS. 1 and 2. The angle $\alpha$ of the throttle valve 16, the engine rotational speed, $\lambda$ values and, if necessary, temperature values are processed in order to receive a control signal for the adjustment mechanism 20 to the throttle gate 19. The mixture composition can be regulated and adjusted to the desired values by this correction.

Figure 4A:
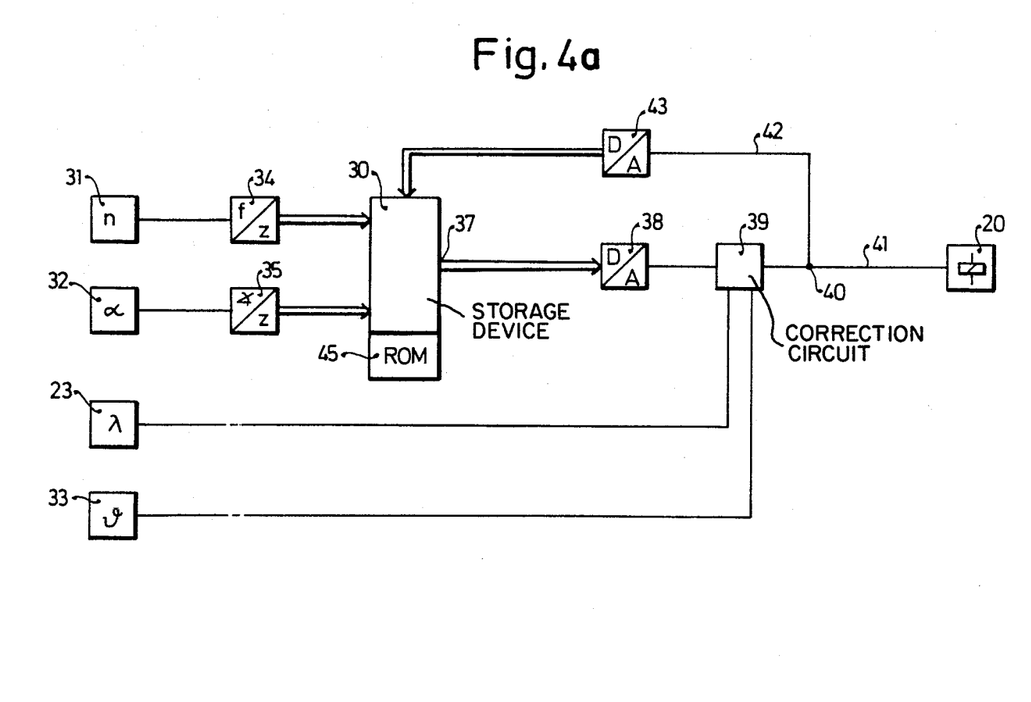
FIGS. 4a and 4b are block diagrams of similar embodiments of the invention for controlling a signaling device in order to correct the carburetor setting.

FIG. 4a shows a block diagram of a digital control device 21 (FIG. 3) with a write-read storage device 30. Inputs to the control device 21 are signals from an engine rotation sensor 31, from a throttle valve aperture angle sensor 32, a $\lambda$-value sensor 23 as well as from a temperature sensor 33. Storage device 30 contains a three-dimensional performance graph, whereby the two variables are a rotation and a throttle valve aperture angle signal. Because of the digital nature of the storage device 30, a frequency rate converter 34 and an angle rate converter 35 are inserted. The value to be read out of the storage device 30 corresponds to the curve $\Delta\lambda\,(n,\alpha)$ of FIGS. 1 and 2. The output 37 of the storage device 30 is connected to a digital-analog converter 38 and following that, to a correction stage 39. In this correction stage 39, the corrected $\lambda$-values read out of the storage device 30 are further corrected according to the temperature. The correction stage 39 is connected at its output with a node 40 from which one loop 41 leads to the adjustment mechanism 20 and another loop 42 leads to an analog-digital converter provides at each instant a newly corrected value for a certain storage location (speed and load). The block diagram in FIG. 4a is very schematic, but it illustrates best the concept of the invention, namely, the continuous change of the stored values dependent on the operating characteristics as well as on a $\lambda$-value and on temperature.

Because of this regulation process of the stored values as mentioned above, it is possible to begin from the stored values zero at each new start of the engine, since the stored values are constantly corrected according to selected operating characteristics. Thus, a new recording of $\lambda$-values results in a delay in generating the optimum values after each new start of the engine. In order to reach this optimum value level faster, we recommend the storing, for example, of empirically found values of the magnitude $\Delta\lambda(n,\alpha)$ according to FIG. 1 in a read-only memory device and with each new start of the engine, the transmission of these stored values to a working storage device, such as a write-read storage. This is indicated in the block diagram of FIG. 4a by an additional box 45 beside the storage device 30, which should contain a read-only memory device (ROM).

Figure 4B:
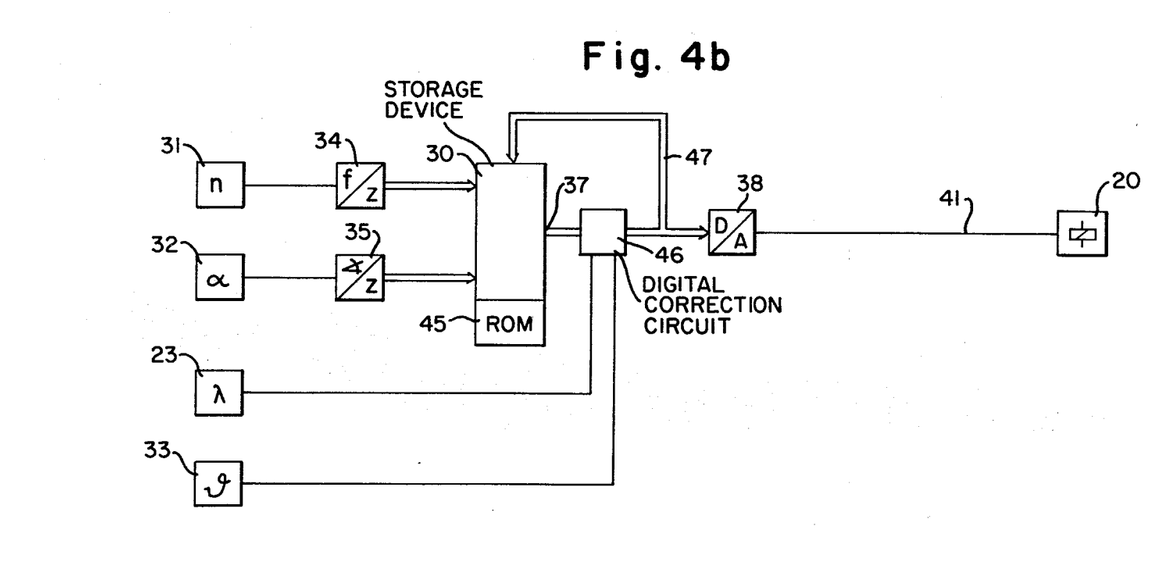

In the system described in the block diagram of FIG. 4a, the correction of the values coming from the storage device 30 takes place in the analog area. But there are cases, especially where more building elements have to be integrated in which the correction of the read-out values takes place in the digital area. This solution is shown in FIG. 4b where a digital correction stage 46 follows directly the storage exit 37. This digital correction stage also receives its correction signals, a $\lambda$-value and a temperature value, from the two sensors 23 and 33.

With this alternative processing case of the correction values, we also recommend an immediate return of the corrected values to the storage device 30 through a multipolar loop connection 47.

Figure 5:
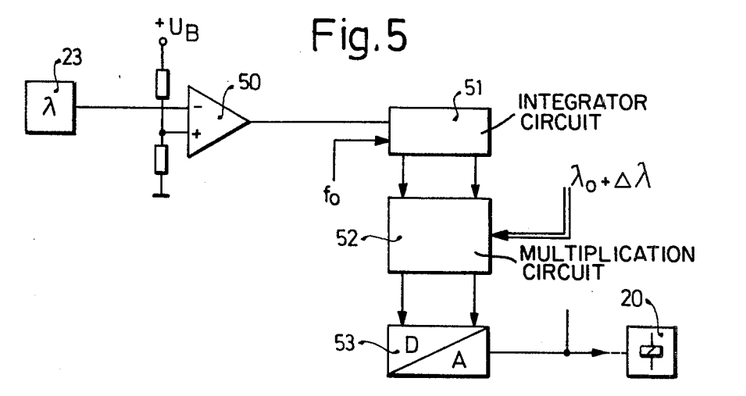
FIG. 5 shows a signal processing device used in connection with the mechanism of FIG. 4.

FIG. 5 shows a sample of a correction unit, for which the total value $\lambda_0+\Delta\lambda$ is corrected by multiplication in line with a certain $\lambda$-value. In the circuit of FIG. 5, the signal of a $\lambda$-value sensor 23 is sent to a threshold value switch 50, whose output signal determines the integration direction of an integrator 51. This integrator 51 operates with an integration time constant, or parameter, dependent on a counting rate $f_0$. According to the integrator value, the instantaneous value $\lambda_0+\Delta\lambda$ is corrected by multiplication in a multiplication unit 52 and the corrected signal transformed by a digital-analog converter 53 into an analog command value for the adjustment mechanism 20. The value $\lambda_0+\Delta\lambda$ to be multiplied corresponds to the values shown in FIGS. 1 and 2, which are stored and ready to be called upon in the storage devices. From the value combination $\lambda_0+\Delta\lambda$, the values for $\lambda_0$ are stored properly only in a read-only memory and the values for $\Delta\lambda$ in a write-read storage device.

Figure 6:
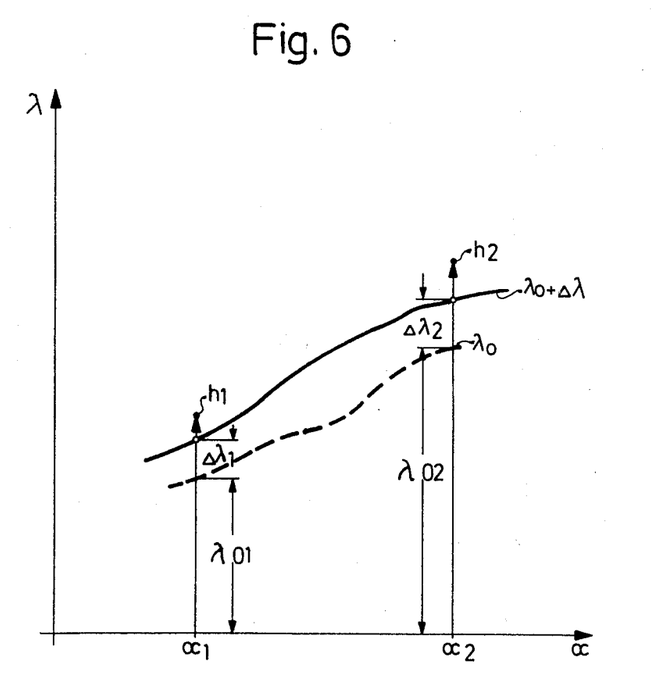
FIG. 6 shows a diagram which illustrates the correction process for the device illustrated in FIG. 5.

FIG. 6 illustrates how the circuit arrangement of FIG. 5 functions. Shown is a curve for the $\lambda$-values as well as a curve for the $\lambda_0+\Delta\lambda$ values. The starting values of the multiplier 52 are marked $h_1$ and $h_2$. With this kind of multiplication correction, the whole performance graph is raised or lowered according to the frequency of the sign of deviation (derived from a $\lambda$-value). This additional correction factor is reduced with a relatively long time constant, in order that, in the stationary stage, the correction of the basic adaptation $\lambda_0$ is performed completely by the performance graph. A similar function of trend recognition and/or reference regarding the deviation, can be achieved in analog by means of a low-pass filter.

Figure 7:
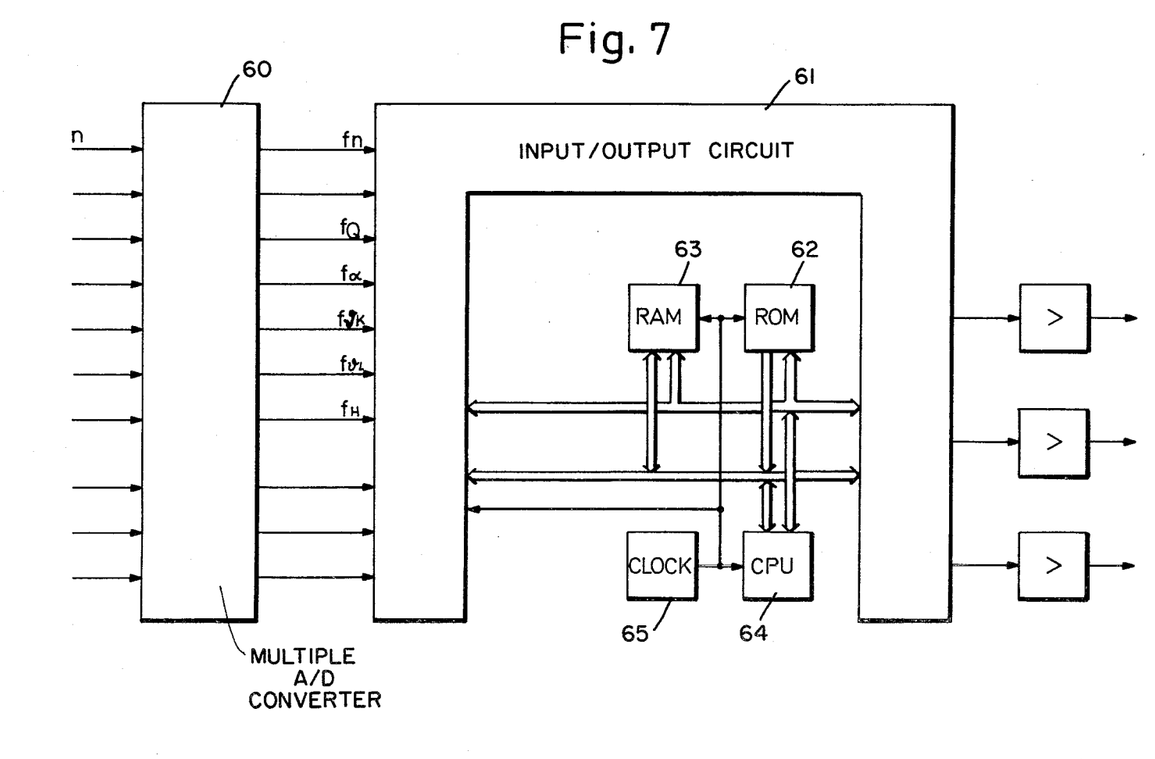
FIG. 7 shows the basic structure of a computer used according to the teaching of this invention.

An especially practical implementation of the above-mentioned embodiment is achieved by means of a microprocessor, as shown in FIG. 7. The individual parts or units constituting the multiple analogue/digital converter 60, the input/output circuit 61, the read only memory device (ROM) 62, the random access memory (RAM) 63, the micro-processor unit 64, and the clock circuit 65 of the FIG. 7 are commercially available and can be put together as well as programmed by a computer expert. For example, the analogue multiplexer 104 and the analogue-to-digital converter 136 described in the U.S. Pat. No. 3,969,614 for A Method and Apparatus for Engine Control, issued July 13, 1976, to Moyer et al, can be used as the multiple analogue/digital converter 60. The type CD 4016 quad bilateral switch and type CD 4052 differential 4-channel multiplexers/-demultiplexers, manufactured by the RCA Corporation, can be used for the input/output circuit 61. The RCA type CDP 1833 CD read-only memory may be used for the ROM device 62. The RCA type CDP 1824 random-access memory may be used for the RAM device 63, and the RCA type CDP 1802 D microprocessor may be used for the CPU device 64.

When using a simple carburetor for the rough precontrol setting for the mixture composition, the performance graph is stored in the write-read memory 63 (RAM) as already described above. The requested value which corresponds concurrently to the input data is being used for the regulation of the final control element. In this process, the address and data word are shortly interpolated. Through the regulator (for example, $\lambda=1$-regulator), it is indicated if this data word is to be corrected. Then the corrected word is stored again under the old address. The control of the complete process is contained in a program which is stored in the set value storage device 62 (ROM). If an electronic gasoline injection is used, a performance graph for the rough precontrol of the injection time can be stored additionally in a set value storage device.

The following advantages of the method and apparatus mentioned above can be summarized:

(a) The basic performance graph adjustment is substantially simplified because an optimum value is is achieved by the regulation process;

(b) A greater accuracy than is usual, especially in the stationary or idling operation, is achieved, which is especially important in regard to controlling exhaust gas emission and fuel consumption;

(c) An automatic equalization of variations in construction of the fuel unit takes place because the regulation process is oriented to the optimum performance of the fuel-burning engine; and (d) The system can be universally applied without changes in the existing electronic components. For example, it can be used for the reduction of exhaust gas as well as for a control of the ignition angle.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for determining an adjustment value for a fuel supply device in a fuel-burning engine having an operational setting according to its construction tolerances comprising:

providing a first storage device containing permanent adjustment values for said fuel supply device according to at least one engine operating condition signal;

providing a second storage device for receiving the permanent adjustment values from said first storage device;

transmitting the permanent adjustment values from the first storage device to said second storage device upon engine startup;

continually transmitting said at least one engine operating condition signal to said second storage device;

continually transmitting stored adjustment values from the second storage device corresponding to instantaneous values of the at least one engine operating condition signal;

continually transmitting at least one additional engine operating condition signal;

correcting the adjustment values transmitted from the second storage in accordance with corresponding instantaneous values of said at least one additional engine operating condition signal, to produce corrected adjustment values;

continually transmitting an engine $\lambda$ value signal;

adjusting the corrected adjustment values by multiplying the corrected adjustment values by corresponding instantaneous values of the engine $\lambda$ value signal to produce final adjustment values;

transmitting the final adjustment values to the fuel supply device and to the second storage device; and exchanging the final adjustment values with corresponding stored adjustment values in the second storage device.

2. The method as claimed in claim 1, wherein said at least one engine operating condition signal comprises a first signal indicating the engine speed.

3. The method as claimed in claim 2, wherein said at least one engine operating condition signal further comprises a second signal indicating the throttle valve opening angle of a carburetor for the engine.

4. The method as claimed in claim 3, wherein said at least one additional engine operating condition signal comprises an engine temperature signal.

5. A system for determining an adjustment value for a fuel supply apparatus in a fuel-burning engine, comprising:

at least one sensor for sensing and transmitting signal values of an engine operating condition;

a first storage means, connected to a second storage means and containing adjustment values corresponding to the signal values of said at least one sensor, for transmitting said adjustment values to said second storage means upon engine startup;

an adjustment mechanism for adjusting the operation of said fuel supply apparatus;

said second storage means, connected to receive and store the adjustment values from said first storage means and to receive the signal values from said at least one sensor, for transmitting adjustment values corresponding to instantaneous signal values of said at least one sensor, said second storage means including value exchange means for receiving and exchanging new values with stored adjustment values corresponding to the instantaneous signal values of said at least one sensor;

at least one additional sensor for sensing and transmitting signal values of an additional engine operating condition;

value correction means, connected to receive said adjustment values transmitted from said second storage means and said signal values of an additional engine operating condition transmitted from said at least one additional sensor, for correcting said adjustment values in accordance with corresponding signal values from said at least one additional sensor;

an $\lambda$ value sensor means for sensing and transmitting signal values of the engine $\lambda$ value;

value adjusting means, connected to receive the signal values transmitted from said $\lambda$ value sensor means and to receive the corrected adjustment values from said value correction means, for multiplying the corrected adjustment values by corresponding values of the signal values transmitted from the $\lambda$ value sensor means, to produce final adjustment values for the adjustment mechanism and the value exchange means of said second storage means; and circuit means for transmitting the final adjustment values to the adjustment mechanism and to the value exchange means to the second storage means.

6. The system as claimed in claim 5, further including a microprocessor connected to both said storage means for controlling the operation of said storage means.

7. The system as claimed in claim 6, wherein said first storage means comprises a ROM.

8. The system as claimed in claim 7, wherein said second storage means comprises an erasable memory.

9. The system as claimed in claim 5, further including an integrator between said $\lambda$-value sensor means and said second storage means.

10. The system as claimed in claim 5, wherein said at least one sensor includes a sensor for sensing and transmitting signal values for the throttle valve opening angle of an engine carburetor.

11. The system as claimed in claim 5, wherein said at least one sensor includes a sensor for sensing and transmitting signal values for the engine speed.

12. The system as claimed in claim 5, wherein said at least one additional sensor comprises a sensor for sensing and transmitting signal values of the engine temperature.

13. The system as claimed in claim 12, wherein said at least one sensor comprises:
- a first sensor for sensing and transmitting signal values for the engine speed; and
- a second sensor for sensing and transmitting signal values for the throttle valve opening angle of an engine carburetor.

* * * * *